(12) United States Patent
Peng

(10) Patent No.: US 9,947,349 B2
(45) Date of Patent: *Apr. 17, 2018

(54) WAVEGUID WITH TAPERED ASSISTANT LAYER

(71) Applicant: Seagate Technology LLC, Cupertino, CA (US)

(72) Inventor: Chubing Peng, Eden Prairie, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/863,096

(22) Filed: Sep. 23, 2015

(65) Prior Publication Data

US 2017/0084298 A1 Mar. 23, 2017

(51) Int. Cl.
| | |
|---|---|
| *G02B 6/26* | (2006.01) |
| *G11B 5/48* | (2006.01) |
| *G02B 6/122* | (2006.01) |
| *G02B 6/12* | (2006.01) |
| *G11B 5/00* | (2006.01) |

(52) U.S. Cl.
CPC ........ *G11B 5/4866* (2013.01); *G02B 6/12002* (2013.01); *G02B 6/1228* (2013.01); *G02B 2006/12038* (2013.01); *G02B 2006/12147* (2013.01); *G11B 2005/0021* (2013.01)

(58) Field of Classification Search
USPC ............................................... 385/28, 49–50
See application file for complete search history.

(56) References Cited

U.S. PATENT DOCUMENTS

| | | | | |
|---|---|---|---|---|
| 6,052,397 | A * | 4/2000 | Jeon ...................... | G02B 6/1228 372/46.01 |
| 6,253,009 | B1 * | 6/2001 | Lestra .................. | G02B 6/1228 257/E31.127 |
| 7,184,643 | B2 | 2/2007 | Blauvelt et al. | |
| 8,295,010 | B2 | 10/2012 | Shimazawa et al. | |
| 8,385,183 | B2 | 2/2013 | Peng et al. | |
| 8,588,039 | B1 * | 11/2013 | Shi ......................... | G11B 5/314 369/13.13 |
| 8,873,349 | B2 | 10/2014 | Peng | |
| 9,405,066 | B2 | 8/2016 | Mahgerefteh et al. | |
| 2008/0204916 | A1 | 8/2008 | Matsumoto et al. | |
| 2013/0279313 | A1 | 10/2013 | Huang et al. | |
| 2014/0140659 | A1 | 5/2014 | Demaray | |

(Continued)

OTHER PUBLICATIONS

Mar. 23, 2017, File History for U.S. Appl. No. 14/863,117.

*Primary Examiner* — Eric Wong
(74) *Attorney, Agent, or Firm* — Hollingsworth Davis, LLC

(57) ABSTRACT

An apparatus includes a waveguide extending along a light-propagation direction between a light source and a media-facing surface. An assistant layer is configured to receive light from a light source, the assistant layer has a terminating end with a first taper that narrows toward the media-facing surface. A core layer has a coupling end configured to receive light from the assistant layer, the coupling end having a second taper that widens toward the media-facing surface. A middle cladding layer is disposed between the core layer and the assistant layer. A near field transducer is disposed proximate the media-facing surface and configured to receive the light from the core layer.

21 Claims, 10 Drawing Sheets

(56) References Cited

U.S. PATENT DOCUMENTS

| | | |
|---|---|---|
| 2015/0121685 A1 | 5/2015 | Clinton et al. |
| 2015/0179197 A1* | 6/2015 | Clinton ................ G11B 5/4866 369/13.33 |
| 2017/0052317 A1 | 2/2017 | Mahgerefteh et al. |

* cited by examiner

WAVEGUID WITH TAPERED ASSISTANT LAYER

SUMMARY

The present disclosure is related to a waveguide extending along a light-propagation direction between a light source and a media-facing surface. The waveguide comprises an assistant layer configured to receive light from a light source, the assistant layer comprising a terminating end with a first taper that narrows toward the media-facing surface. A core layer comprises a coupling end configured to receive light from the assistant layer, the coupling end comprising a second taper that widens toward the media-facing surface. A middle cladding layer is disposed between the core layer and the assistant layer. A near field transducer is disposed proximate the media-facing surface and configured to receive the light from the core layer.

According to various embodiments, an apparatus comprises a waveguide extending along a light-propagation direction between a light source and a media-facing surface. The waveguide comprises an assistant layer configured to receive light from a light source, the assistant layer comprising a terminating end with a first taper that narrows toward the media-facing surface. A core layer comprising a coupling end is configured to receive light from the assistant layer, the coupling end comprising a second taper having a first width proximate the light source and a second width away from the light source, the second width being greater than the first width. A middle cladding layer is disposed between the core layer and the assistant layer, the middle layer facilitating increasing the first width without impacting coupling of the light into the core layer. A near field transducer is disposed proximate the media-facing surface and configured to receive the light from the core layer.

These and other features and aspects of various embodiments may be understood in view of the following detailed discussion and accompanying drawings.

BRIEF DESCRIPTION OF THE DRAWINGS

In the following diagrams, the same reference numbers may be used to identify similar/same/analogous components in multiple figures. The figures are not necessarily to scale.

DETAILED DESCRIPTION

The present disclosure generally relates to writing data with a heat assisted magnetic recording (HAMR) device. This technology, also referred to as energy-assisted magnetic recording (EAMR), thermally-assisted magnetic recording (TAMR), and thermally-assisted recording (TAR), uses an energy source such as a laser to heat a small spot on a magnetic disk during recording. The heat lowers magnetic coercivity at the spot, allowing a write transducer to change magnetic orientation. Due to the relatively high coercivity of the medium after cooling, the data is less susceptible to paramagnetic effects that can lead to data errors.

In some configurations, a HAMR write head has a waveguide that delivers light from an energy source (e.g., laser diode) to a near-field transducer (NFT), also referred to as a near-field antenna, plasmonic transducer/antenna, etc. The light generates a surface plasmon field on the NFT, and the surface plasmons are directed out of a surface of the write head onto a magnetic recording medium. This creates a hotspot on the recording medium during writing. Optimal coupling is achieved by matching the mode profile between the laser diode and the waveguide on slider.

Figure 1:
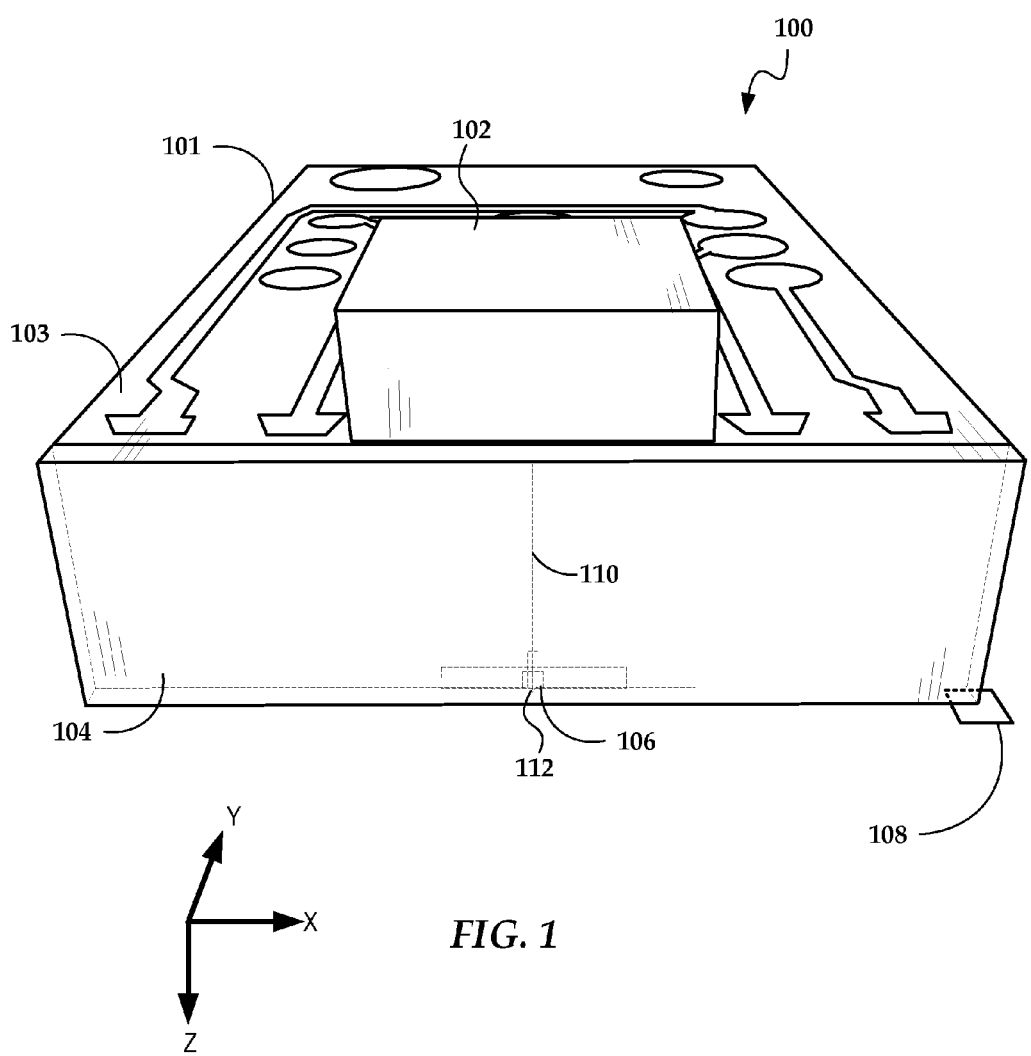
FIG. 1 is a perspective view of a slider assembly according various embodiments described herein.

In reference to FIG. 1, a perspective view shows a HAMR write head 100 according to an example embodiment. The write head 100 includes a laser diode 102 located on input surface 103 of a slider body 101. In this example, the input surface 103 is a top surface, which is located opposite to a media-facing surface 108 that is positioned over a surface of a recording media (not shown) during device operation. The media-facing surface 108 faces and is held proximate to the moving media surface while reading and writing to the media. The media-facing surface 108 may be configured as an air-bearing surface (ABS) that maintains separation from the media surface via a thin layer of air.

The laser diode 102 delivers light to a region proximate a HAMR read/write transducer 106, which is located near the media-facing surface 108. The energy is used to heat the recording media as it passes by the read/write transducer 106. Optical coupling components, such as a waveguide system 110, are formed integrally within the slider body 101 (near a trailing edge surface 104 in this example) and function as an optical path that delivers energy from the laser diode 102 to the recording media via a near-field transducer 112. The near-field transducer 112 is located near the read/write transducer 106 and causes heating of the media during recording operations. The near-field transducer 112 may be made from plasmonic materials such as gold, silver, copper, rhodium, platinum, iridium, etc.

The laser diode 102 in this example may be configured as either an edge-emitting laser or surface-emitting laser. Generally, the edge-emitting laser, also called in-plane laser, emits light along the wafer surface of a semiconductor chip and a surface emitting laser emits light in a direction perpendicular to a semiconductor wafer surface. An edge-emitting laser may be mounted on the top surface 103 of the slider body 101 (e.g., in a pocket or cavity) such that the light is emitted in a direction perpendicular to the media-facing surface (along the negative z-direction in this view).

While the example in FIG. 1 shows a laser diode 102 directly mounted to the slider body 101, the waveguide system 110 discussed herein may be applicable to any type of light delivery configuration. For example, a submount (not shown) may be used between a laser diode and the slider body 101. In such a case, the submount orients the laser diode so that an active region of the laser diode is oriented in a vertical direction (z-direction in this view) and is aligned with the waveguide system 110.

Figure 2A:
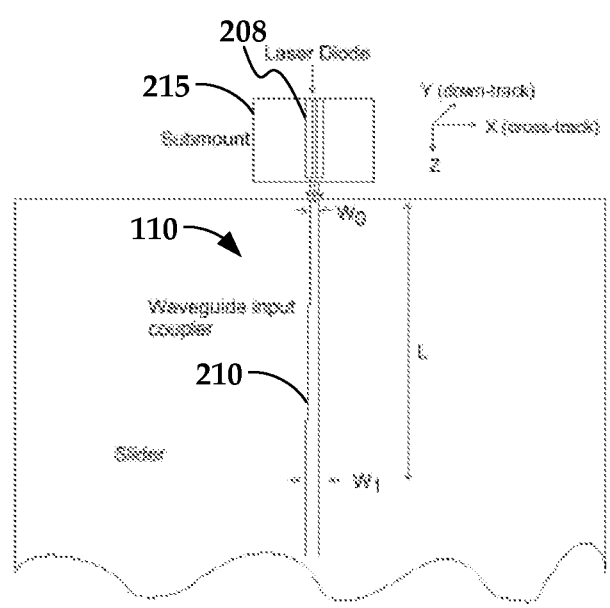
FIGS. 2A-2C illustrate cross-sectional portions of the slider body according to some embodiments.
Figure 2B:
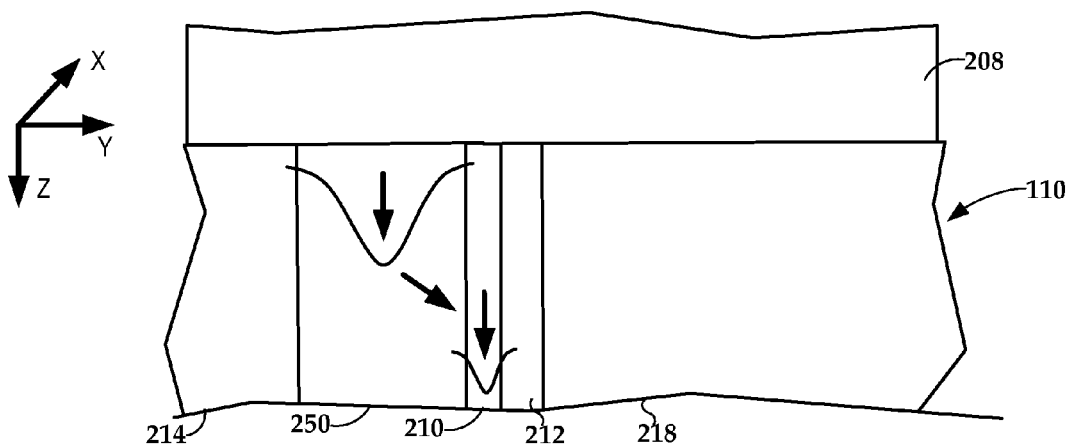
Figure 2C:
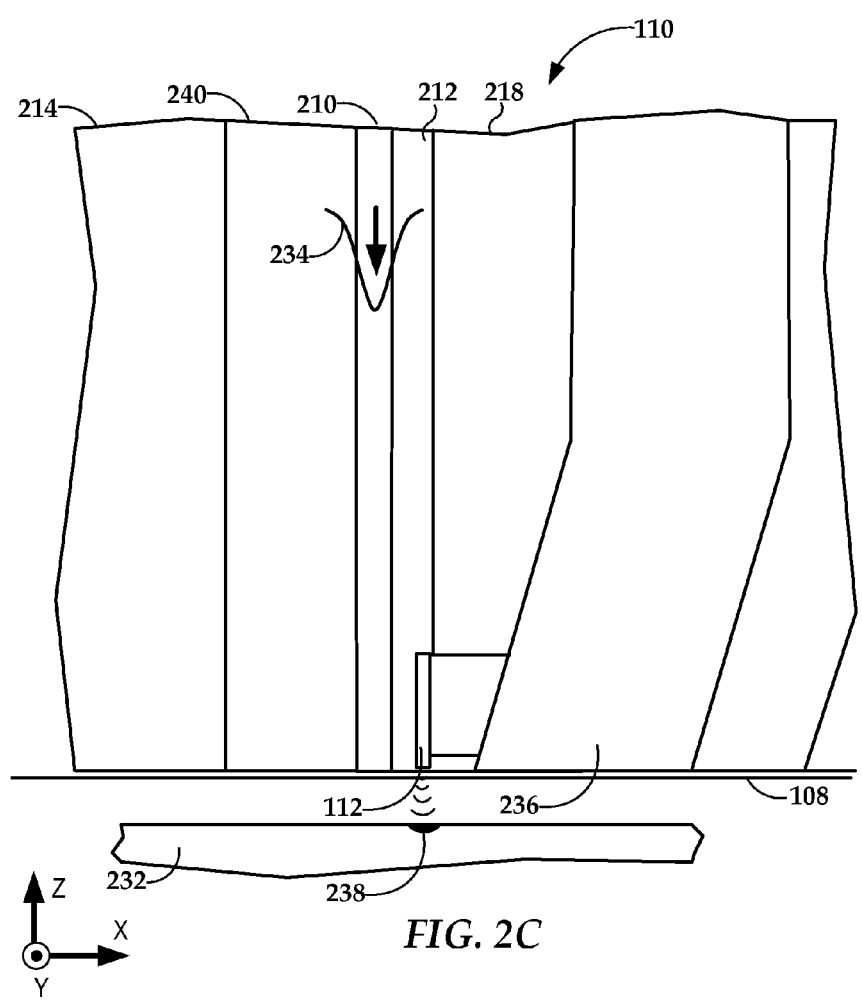

FIGS. 2A-2C illustrate cross-sectional portions of the slider body 101 according to various embodiments. 2A shows a portion of the slider body proximate a light/energy source 208 (e.g., an edge-emitting laser diode). In this example, the light/energy source is mounted on a submount 215. A core 210 of waveguide 110 extends along the light propagation direction (z-direction) where it is directly or indirectly coupled to a light/energy source 208 at a first end of the waveguide core. The waveguide core 210 has a tapered input coupler region having a first width $W_0$ proximate the light source 208. The input coupler region flares to a second width $W_1$ as it extends away from the light source 208.

As seen in FIG. 2B, an assistant layer 250 is positioned proximate the waveguide core 210 to couple light from the light source 208 into the core 210 at or near the region where the core 210 tapers from narrower width ($W_0$) to wider width ($W_1$). According to various implementations $W_0$ is between about 100 nm and 280 nm or between about 150 nm to about 240 nm. In some cases, $W_1$ is chosen such that the waveguide mode is confined to the core and single mode waveguide. The length of the taper may be about 50-150 µm. The assistant layer 250 (thickness along y direction and index of refraction) may be optimized to match the mode size of the light source 208 along y direction and the core width $W_0$ adjacent to the light source 208 is chosen to match the mode size of the light source 208 along x direction.

As previously described, the core width (along cross-track direction) increases as the distance away from the light source 208 increases ($W_1 > W_0$). Light exiting from the light source 208 is first coupled into the assistant layer 250 and is transferred into the waveguide core 210 slowly. The waveguide system 110 includes side cladding layers 212, bottom cladding layer 214, and top cladding layer 218 that surround the core 210 and the assistant layer 250. As shown in FIG. 2C, the assistant layer 250 may be truncated with intermediate bottom cladding layer 240 after the light is coupled into the waveguide core 210. This may improve the excitation efficiency of the near-field transducer 112 if the refractive index of intermediate bottom cladding layer 240 is lower than that of side cladding layers 212.

According to various implementations, the waveguide core 210 is made of dielectric materials of high index of refraction, for instance, $Ta_2O_5$, $TiO_2$, $Nb_2O_5$, $Si_3N_4$, SiC, $Y_2O_3$, ZnSe, ZnS, ZnTe, $Ba_4Ti_3O_{12}$, GaP, $CuO_2$, and Si. The assistant layer 250 may be formed of a dielectric material having an index of refraction slightly higher than that of the cladding layers 214, 212, and 218 but much lower than that of the core, for instance, SiOxNy, AlN, and alloys $SiO_2$—$Ta_2O_5$, $SiO_2$—ZnS, $SiO_2$—$TiO_2$. The cladding layers 212, 214, 218, 240 are each formed of a dielectric material having a refractive index lower than the core 210 and the assistant layer 250, be made of a material, for instance, $Al_2O_3$, SiO, and $SiO_2$. The cladding layers 212, 214, 218, 240 may be formed of the same material. In some cases, the cladding layers 212, 214, 218, 240 are formed of different materials. Generally, the dielectric materials are selected so that the refractive index of the core layer 210 is higher than refractive indices of the cladding layers 212, 214, 218, 240. This arrangement of materials facilitates efficient propagation of light through the waveguide system.

In FIG. 2C, the near-field transducer 112 is shown proximate to a surface of magnetic recording medium 232, e.g., a magnetic disk. The waveguide system 110 delivers electromagnetic energy 234 to the near-field transducer 112, which directs the energy 234 to create a small hot spot 238 on the recording medium 232. A magnetic write pole 236 causes changes in magnetic flux near the media-facing surface 108 in response to an applied current. Flux from the write pole 236 changes a magnetic orientation of the hot spot 238 as it moves past the write pole 236 in the downtrack direction (y-direction).

In some embodiments, the energy 234 propagating in the waveguide core 210 is at a fundamental transverse electric ($TE_{00}$) mode or a fundamental transverse magnetic ($TM_{00}$) mode. According to various implementations, there is mode mismatch between the light source and the waveguide. Efficient coupling from light source to waveguide may be preferred to reduce energy consumption for recording, and also to mitigate heating that occurs from stray light, for instance, light induced writer protrusion. The coupling efficiency is determined by the mode overlap between the light source and the waveguide. For a typical edge-emitting laser diode, the output beam size in $1/e^2$ intensity full width is about 1.2 µm along its fast axis direction and 5.2 µm along its slow axis direction. For a waveguide used in heat-assisted magnetic recording, the fundamental mode size is about 0.25 µm normal to waveguide plane and smaller than 0.50 µm parallel to the waveguide plane.

According to various implementations, the light source is a TE (transverse electric) polarized edge-emitting laser diode, orientated such that its fast-axis normal to (along y direction) and slow-axis is parallel to (along x direction) the waveguide plane. The waveguide system 110 may include a multiplexer that converts the energy 234 to a combined polarization mode. The combined mode includes a fundamental transverse $TM_{00}$ mode and a first higher-order transverse electric, $TE_{10}$. The near-field transducer 112 is excited by the combined mode, and in response, tunnels direct plasmons to the recording medium 232.

Figure 3A:
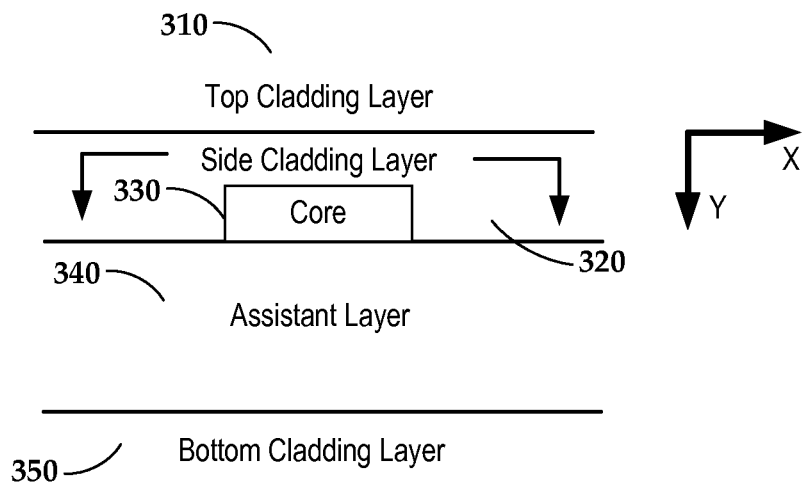
FIGS. 3A and 3B illustrate different cross sectional views of the slider body according to various embodiments.
Figure 3B:
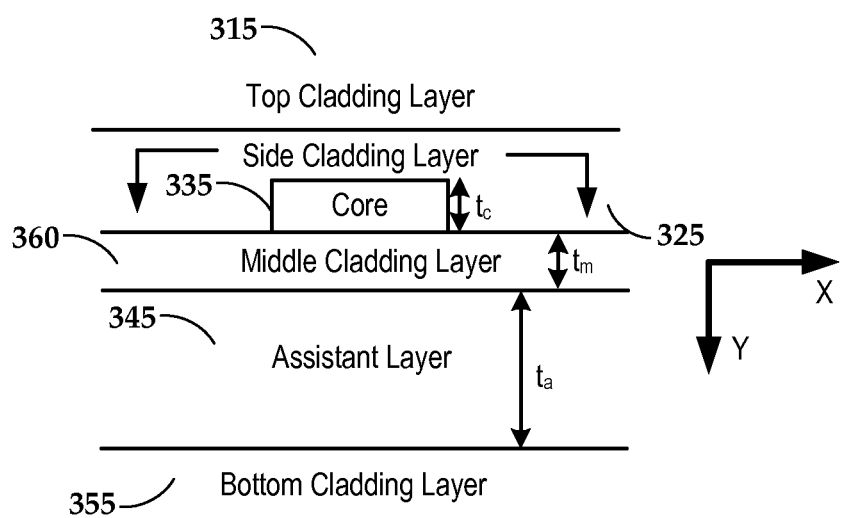

FIGS. 3A and 3B illustrate different cross-sectional views of a slider body according to various embodiments. As seen in FIG. 3A, an assistant layer 340 couples light from the light source into the waveguide core 330. The core 330 is surrounded by a side cladding layer 320, a top cladding layer 310, the assistant layer 340, and a bottom cladding layer 350. According to various implementations, the waveguide core 330 comprises $TiO_2$ and is about 120 nm thick with an index of refraction of 2.36. As seen in FIG. 3B, a waveguide core 335 and the assistant layer 345 may be surrounded by other cladding layers 315, 325, 355 having a lower index of refraction than the waveguide core 335. For either configuration, the top cladding may be formed of $SiO_2$ having an index of refraction of 1.46. The side and bottom cladding for either configuration may use $Al_2O_3$ and have an index of refraction of 1.65. The side cladding layers 320, 325 may be 220 nm thick, for example. According to various implementations, the thickness of the assistant layer 340, 345 ($t_a$) is 0.7 µm. In some cases, the index of refraction of the assistant layer 340, 345 is 1.70.

According to various embodiments, a middle cladding layer 360 may be used between the waveguide core 335 and the assistant layer 345 as shown in FIG. 3B. The middle cladding layer 360 allows an increase in the start width $W_0$ of the input taper of the waveguide core 335. According to various embodiments described herein, the middle cladding layer 360 has a low index of refraction. The insertion of a low index middle cladding layer 360 reduces the effective index of refraction of the waveguide core 330 and further delocalizes the mode to match the mode of the light source. According to various embodiments, the middle cladding layer 360 has an index of refraction lower than that of the assistant layer 345. For example, the index of refraction of the middle cladding layer may be about 1.46. The same material as the other cladding layers 315, 325, 355 may be used for the middle cladding layer 360.

Figure 4A:
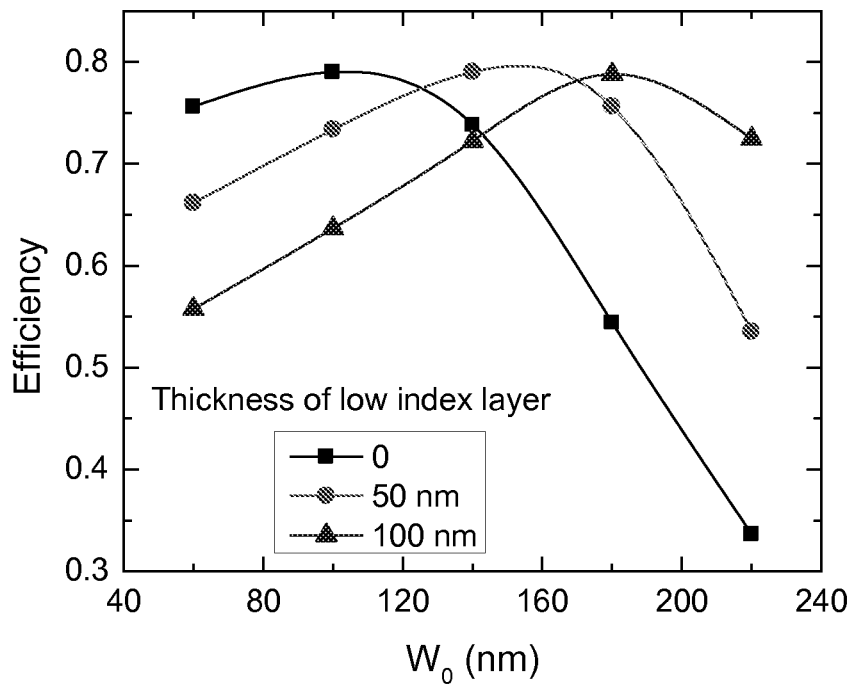
FIGS. 4A-4C show the coupling efficiency versus the input coupler start width for a middle cladding layer thickness of 0, 50 and 100 nm in accordance with some implementations.
Figure 4B:
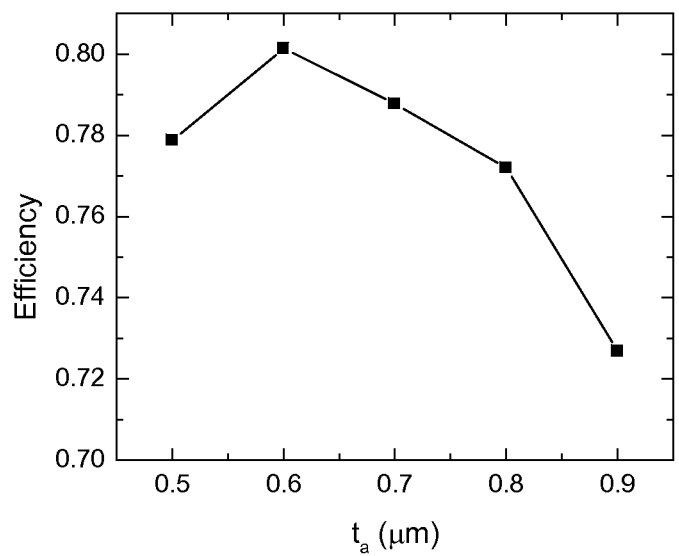
Figure 4C:
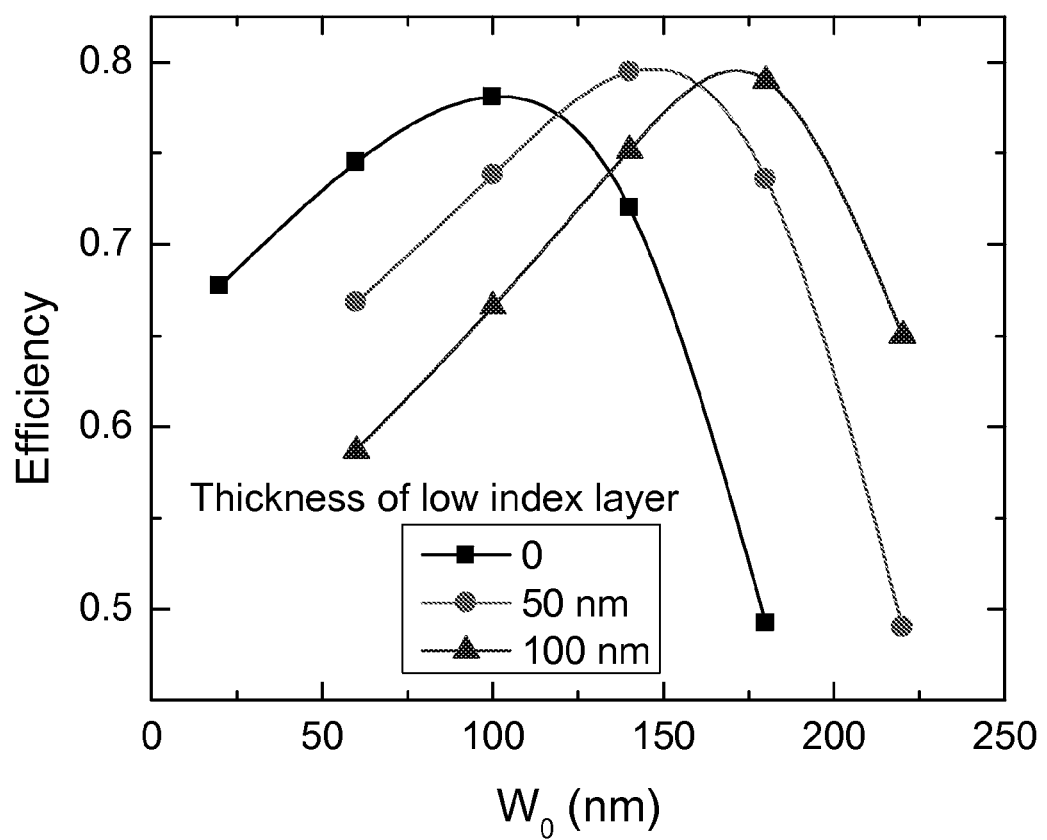

FIGS. 4A-4C illustrate the coupling efficiency versus the input coupler start width $W_0$ for a middle cladding layer thickness ($t_m$) of 0, 50 and 100 nm. In this modeling, SiO$_2$ has an index of refraction of 1.46 and is used as the middle cladding layer. At $t_m$=0 nm, the most efficient start width is about 100 nm. At $t_m$=50 nm, the optimal start width increases from 100 to 150 nm. At $t_m$=100 nm, it further increases to 180 nm. FIG. 4A shows that the addition of the middle cladding layer does not impact the coupling efficiency. FIG. 4B shows the modeling on the thickness of the assistant layer at $t_m$=100 nm and $W_0$=180 nm. As shown in FIG. 4B, the efficiency is highest when the thickness of the assistant layer is about 0.6 μm. FIG. 4C shows another case with a high index core having an index of refraction of 2.70 and using a ferroelectric Bi$_4$Ti$_3$O$_{12}$ or a semiconductor SiC material. For excitation efficiency of a near-field transducer, the core thickness is chosen at 70 nm, for example. At $t_m$=0 nm, the most efficient input coupler start width is about 100 nm. At $t_m$=50 nm, the most efficient input coupler start width increases from 100 to 150 nm, and then to 170 nm at $t_m$=100 nm.

Figure 5A:
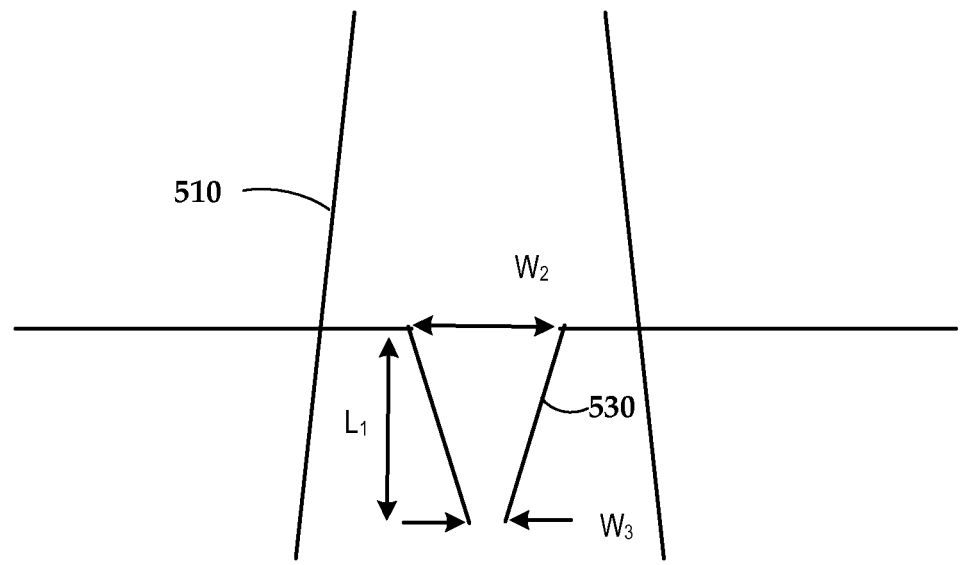
FIGS. 5A-5C illustrate cross sectional portions of the slider body having a tapered assistant layer according to various embodiments described herein.
Figure 5B:
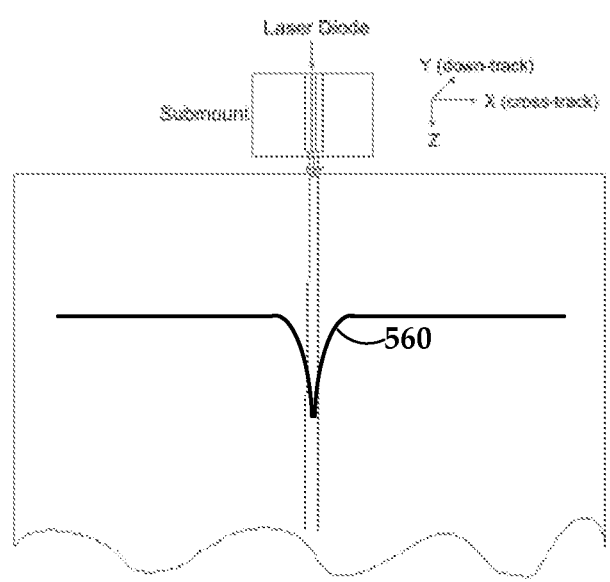
Figure 5C:
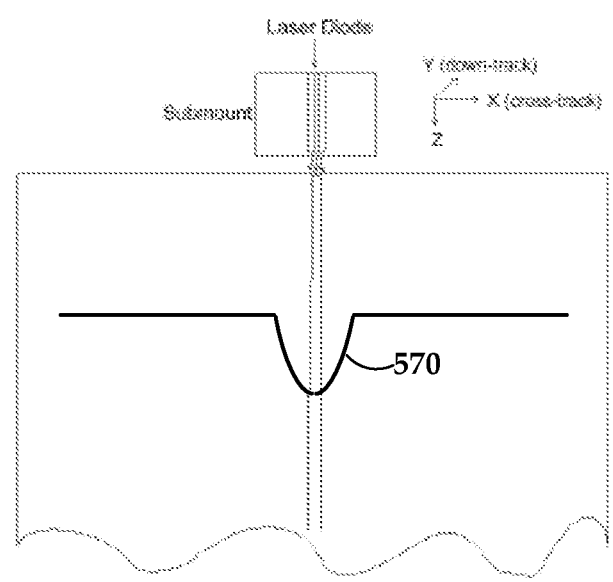

According to various implementations, the assistant layer has a taper that narrows towards the media facing surface as shown in FIGS. 5A-C. As seen in FIG. 5A, a taper starts after the input coupler region of the waveguide core 510 or near the end of input coupler region 510. The tapering in the assistant layer 530 starts from a first width ($W_2$) and terminates at a second width ($W_3$) over length $L_1$. According to various implementations, $W_2$ is chosen to improve the coupling from the light source to waveguide 510, for instance, 3-5 μm and $W_3$ is as small as possible, for example, $W_3$<200 nm, to achieve adiabatic mode transformation from material 250 to 240, see FIG. 2C. FIG. 5A illustrates a linear taper. In other implementations, taper is not linear as shown in FIGS. 5B and 5C for assistant layers 560 and 570. In some cases, the taper may be an in-plane taper.

Figure 6A:
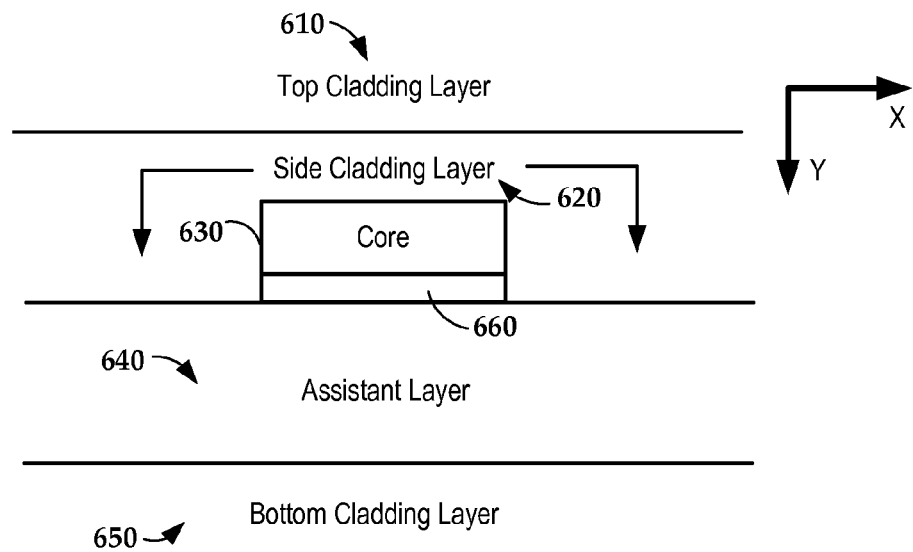
FIGS. 6A-6D show different configurations for the middle cladding layer according to various embodiments
Figure 6B:
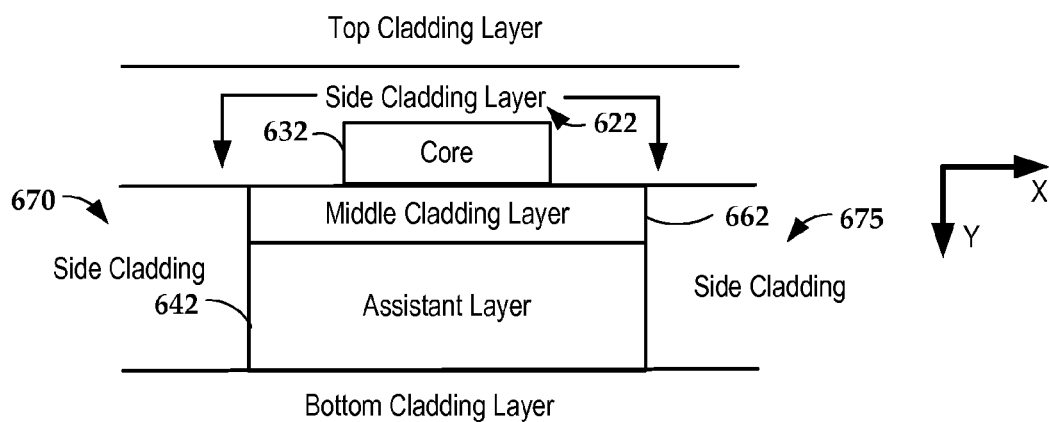
Figure 6C:
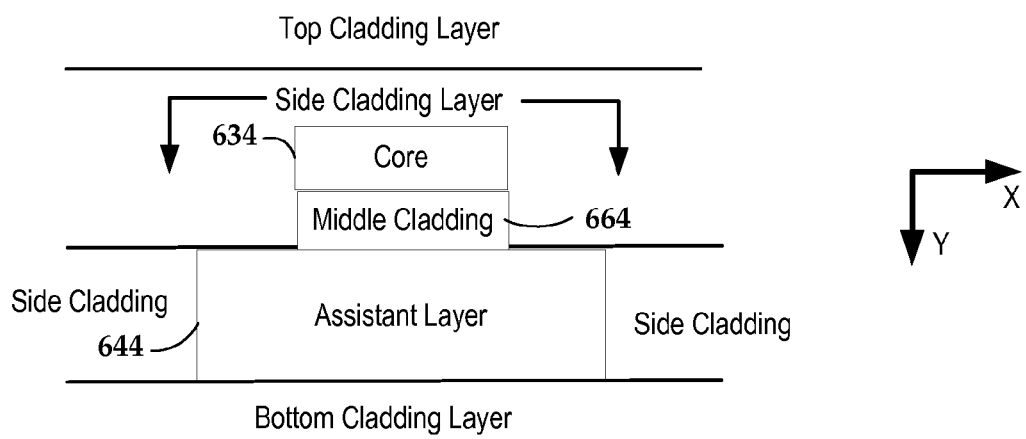

FIGS. 6A-6C illustrate different configurations for the middle cladding layer and the assistant layer. In FIG. 6A, a middle cladding layer 660 is patterned similarly to the waveguide core 630. An assistant layer 640 is positioned proximate the middle cladding layer 660. The waveguide core 630, middle cladding layer 660, and assistant layer 640 are surrounded by other cladding layers 610, 620, 650.

Figure 6D:
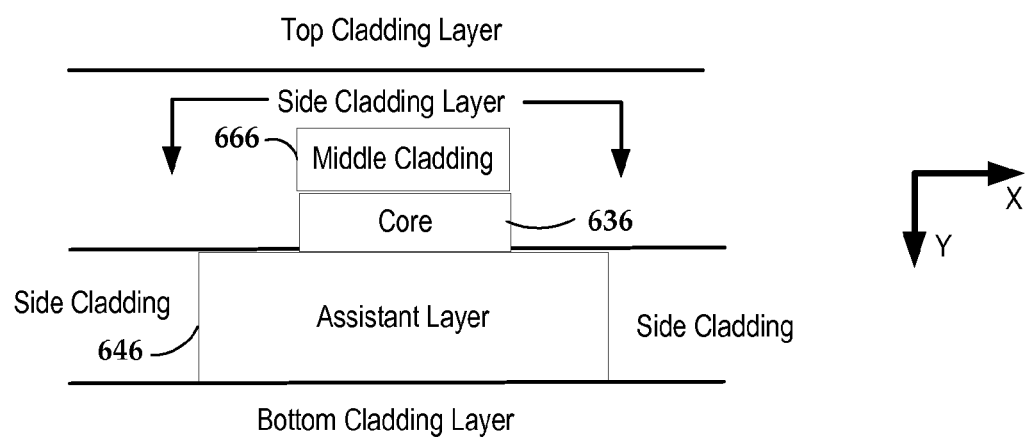

According to various implementations, one or more of the assistant layer and the middle cladding layer is channeled. FIG. 6B shows an example in which the middle cladding layer 662 and the assistant layer 642 are channeled and are surrounded by side cladding layers 670, 675. As shown in FIG. 6C, the core 632 is also surrounded by a side cladding layer 622. In some cases, the middle cladding layer 664 is patterned similarly to the core 634 and the assistant layer 644 is channeled. As shown in FIG. 6D, the middle cladding layer 666 can be also positioned on a side of the waveguide core 636 opposite the assistant layer 646.

According to various embodiments, a method involves receiving light from a light source by an assistant layer that has a terminating end with a first taper. A core layer receives light from the assistant layer. The core layer includes a coupling end and a second taper that widens toward the media-facing surface. A near field transducer receives light from the core layer Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The foregoing description of the example embodiments has been presented for the purposes of illustration and description. It is not intended to be exhaustive or to limit the inventive concepts to the precise form disclosed. Many modifications and variations are possible in light of the above teaching. Any or all features of the disclosed embodiments can be applied individually or in any combination are not meant to be limiting, but purely illustrative. It is intended that the scope be limited not with this detailed description, but rather determined by the claims appended hereto.

What is claimed is:

1. An apparatus, comprising:
    a waveguide extending along a light-propagation direction between a light source and a media-facing surface, the waveguide comprising:
        an assistant layer configured to receive light from a light source, the assistant layer comprising a terminating end with a first taper that narrows toward the media-facing surface;
        a core layer comprising a coupling end configured to receive light from the assistant layer, the coupling end comprising a second taper that widens toward the media-facing surface; and
        a middle cladding layer disposed between the core layer and the assistant layer; and
    a near field transducer disposed proximate the media-facing surface and configured to receive the light from the core layer.

2. The apparatus of claim 1, wherein the waveguide further comprises top and bottom cladding layers configured to confine the light within the core layer, the assistant layer, and the middle cladding layer.

3. The apparatus of claim 1, wherein the second taper has a first width, the middle cladding layer is configured to increase the second taper first width by reducing an effective index of refraction of the core layer.

4. The apparatus of claim 1, wherein the core layer tapers from a first width proximate the light source to a second width away from the light source, the second width being greater than the first width, the middle layer facilitating increasing the first width without decreasing coupling of the light into the core layer.

5. The apparatus of claim 1, wherein at least one of the first taper and second tapers are along a substrate-parallel plane and along the light propagation direction.

6. The apparatus of claim 1, wherein the middle cladding layer has a thickness between 50 and 200 nm.

7. The apparatus of claim 1, wherein the middle cladding layer has an index of refraction lower than that of the assistant layer.

8. The apparatus of claim 1, wherein the middle cladding comprises at least one of SiO$_2$ and Al$_2$O$_3$.

9. The apparatus of claim 1, wherein the first taper comprises a non-linear taper.

10. The apparatus of claim 1, wherein the first taper is a linear taper.

11. The apparatus of claim 1, wherein the first taper is an in-plane taper.

12. The apparatus of claim 1, wherein the width of the waveguide core at the coupling end is between about 140 nm and about 180 nm.

13. An apparatus, comprising:
a waveguide extending along a light-propagation direction between a light source and a media-facing surface, the waveguide comprising:
an assistant layer configured to receive light from a light source, the assistant layer comprising a terminating end with a first taper that narrows toward the media-facing surface;
a core layer comprising a coupling end configured to receive light from the assistant layer, the coupling end comprising a second taper having a first width proximate the light source and a second width away from the light source, the second width being greater than the first width;
a middle cladding layer disposed between the core layer and the assistant layer, the middle layer facilitating increasing the first width without decreasing coupling of the light into the core layer; and
a near field transducer disposed proximate the media-facing surface and configured to receive the light from the core layer.

14. The apparatus of claim 13, wherein the waveguide further comprises top and bottom cladding layers configured to confine the light within the core layer, the assistant layer, and the middle cladding layer.

15. The apparatus of claim 13, wherein the middle cladding layer is configured to increase the second taper first width by reducing an effective index of refraction of the core layer.

16. The apparatus of claim 13, wherein the core layer tapers from a first width proximate the light source to a second width away from the light source, the second width being greater than the first width, the middle layer facilitating increasing the first width without impacting coupling of the light into the core layer.

17. The apparatus of claim 13, wherein at least one of the first taper and second tapers are along a substrate-parallel plane and along the light propagation direction.

18. The apparatus of claim 13, wherein the middle cladding layer has a thickness between 50 and 200 nm.

19. The apparatus of claim 13, wherein the middle cladding layer has an index of refraction lower than that of the assistant layer.

20. The apparatus of claim 13, wherein the middle cladding comprises at least one of $SiO_2$ and $Al_2O_3$.

21. The apparatus of claim 1, wherein:
the core layer comprises a first side and a second opposing side;
the assistant layer is disposed proximate the first side;
the middle cladding layer is disposed between the core layer and the assistant layer on the first side of the core layer; and
a side cladding layer is disposed on the second opposing side of the core layer.

* * * * *